United States Patent
Hsiao

(10) Patent No.: US 9,417,959 B2
(45) Date of Patent: Aug. 16, 2016

(54) FLASH DEVICE AND OPERATING METHOD THEREOF

(71) Applicant: Silicon Motion, Inc., Jhubei, Hsinchu County (TW)

(72) Inventor: Li-Shuo Hsiao, Zhudong Township, Hsinchu County (TW)

(73) Assignee: SILICON MOTION, INC., Jhubei, Hsinchu County (TW)

(*) Notice: Subject to any disclaimer, the term of this patent is extended or adjusted under 35 U.S.C. 154(b) by 102 days.

(21) Appl. No.: 14/059,615

(22) Filed: Oct. 22, 2013

(65) Prior Publication Data

US 2015/0026540 A1 Jan. 22, 2015

(30) Foreign Application Priority Data

Jul. 17, 2013 (TW) .............................. 102125495 A

(51) Int. Cl.
*G06F 11/10* (2006.01)

(52) U.S. Cl.
CPC .... *G06F 11/1068* (2013.01); *G06F 2212/7209* (2013.01)

(58) Field of Classification Search
CPC ..................... G06F 2212/7209; G06F 11/1068
See application file for complete search history.

(56) References Cited

U.S. PATENT DOCUMENTS

| | | | | |
|---|---|---|---|---|
| 6,377,491 B2 * | 4/2002 | Otani et al. | .............. | 365/185.29 |
| 7,437,653 B2 * | 10/2008 | Gorobets | ...................... | 714/782 |
| 7,688,640 B2 * | 3/2010 | Kang | ....................... | 365/185.23 |
| 7,969,806 B2 * | 6/2011 | De Ambroggi et al. | ...... | 365/218 |
| 8,001,432 B2 * | 8/2011 | Orbach et al. | ................. | 714/720 |
| 8,351,290 B1 * | 1/2013 | Huang et al. | ................... | 365/218 |
| 8,549,212 B2 | 10/2013 | Lu | | |
| 9,122,580 B2 | 9/2015 | Huang et al. | | |
| 9,159,423 B1 * | 10/2015 | Brahmadathan | ....... | G11C 16/04 |
| 2008/0151618 A1 * | 6/2008 | Sharon et al. | ............. | 365/185.02 |
| 2010/0070827 A1 * | 3/2010 | Kim et al. | ..................... | 714/758 |
| 2010/0080060 A1 * | 4/2010 | Chen et al. | ............... | 365/185.12 |

FOREIGN PATENT DOCUMENTS

TW 201104690 A 2/2011
TW 201245960 A 11/2012

* cited by examiner

*Primary Examiner* — Steve Nguyen
(74) *Attorney, Agent, or Firm* — McClure, Qualey & Rodack, LLP

(57) ABSTRACT

A flash device is provided. A flash memory includes a plurality of pages. A controller coupled to the flash memory includes an operating unit, an error correction code (ECC) decoder and a processing unit. The operating unit receives a plurality of bytes of the page which are from the flash memory and corresponding to a read command, and obtains an operating result according to a logic level of each bit of each of the bytes. The ECC decoder decodes the bytes of the page according to an ECC code. The processing unit determines whether the page is valid data according to the decoded bytes, and determines whether the page is an empty page according to the operating result when the page is not the valid data.

14 Claims, 5 Drawing Sheets

FLASH DEVICE AND OPERATING METHOD THEREOF

CROSS REFERENCE TO RELATED APPLICATIONS

This Application claims priority of Taiwan Patent Application No. 102125495, filed on Jul. 17, 2013, the entirety of which is incorporated by reference herein.

BACKGROUND OF THE INVENTION

1. Field of the Invention

The invention relates to a flash device, and more particularly, to a flash device capable of determining empty pages.

2. Description of the Related Art

In recent years, flash memories have been made to have the characteristics of data non-volatility, low power consumption, a compact size, and a non-mechanical structure. Hence, flash memories have been applied in various electronic devices, especially portable electronic devices.

A flash memory comprises a plurality of blocks, and each block comprises a plurality of pages for data storage. When the flash memory receives a write command from a controller, the flash memory writes data to pages of the blocks thereof according to the received write command. When the flash memory receives a read command from the controller, the flash memory reads data from pages of the blocks thereof according to the received read command, and then sends read-out data back to the controller.

In a flash memory, a searching page operation is usually used to find the last one valid page during a flash translation layer initialization process. Therefore, how to quick and accurately determine whether the last one valid page is an empty one, will affect the initialization time. If a determination cannot be made, the flash device will re-read the flash memory. Thus, the initialization time is increased.

Therefore, an operation method of a flash memory is desirable, to quickly determine whether a page is an empty page.

BRIEF SUMMARY OF THE INVENTION

A flash device and operating method thereof are provided. An embodiment of a flash device is provided. The flash device comprises: a flash memory, comprising a plurality of pages; and a controller coupled to the flash memory. The controller comprises: an operating unit, receiving a plurality of bytes of the page which are from the flash memory and corresponding to a read command, and obtaining an operation result according to a logic level of each bit of each of the bytes; an error correction code (ECC) decoder, decoding the bytes of the page according to an ECC code; and a processing unit coupled to the operating unit and the ECC decoder, determining whether the page is valid data according to the decoded bytes, and determining whether the page is an empty page according to the operation result when the page is not the valid data.

Furthermore, an embodiment of an operating method for a flash device is provided, wherein a flash memory comprises a plurality of pages. A plurality of bytes of the page which are from the flash memory and corresponding to a read command are received. An operation result is obtained according to a logic level of each bit of each of the bytes. The bytes of the page are decoded according to an error correction code (ECC) code. It is determined whether the page is valid data according to the decoded bytes. It is determined whether the page is an empty page according to the operation result when the page is not the valid data.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
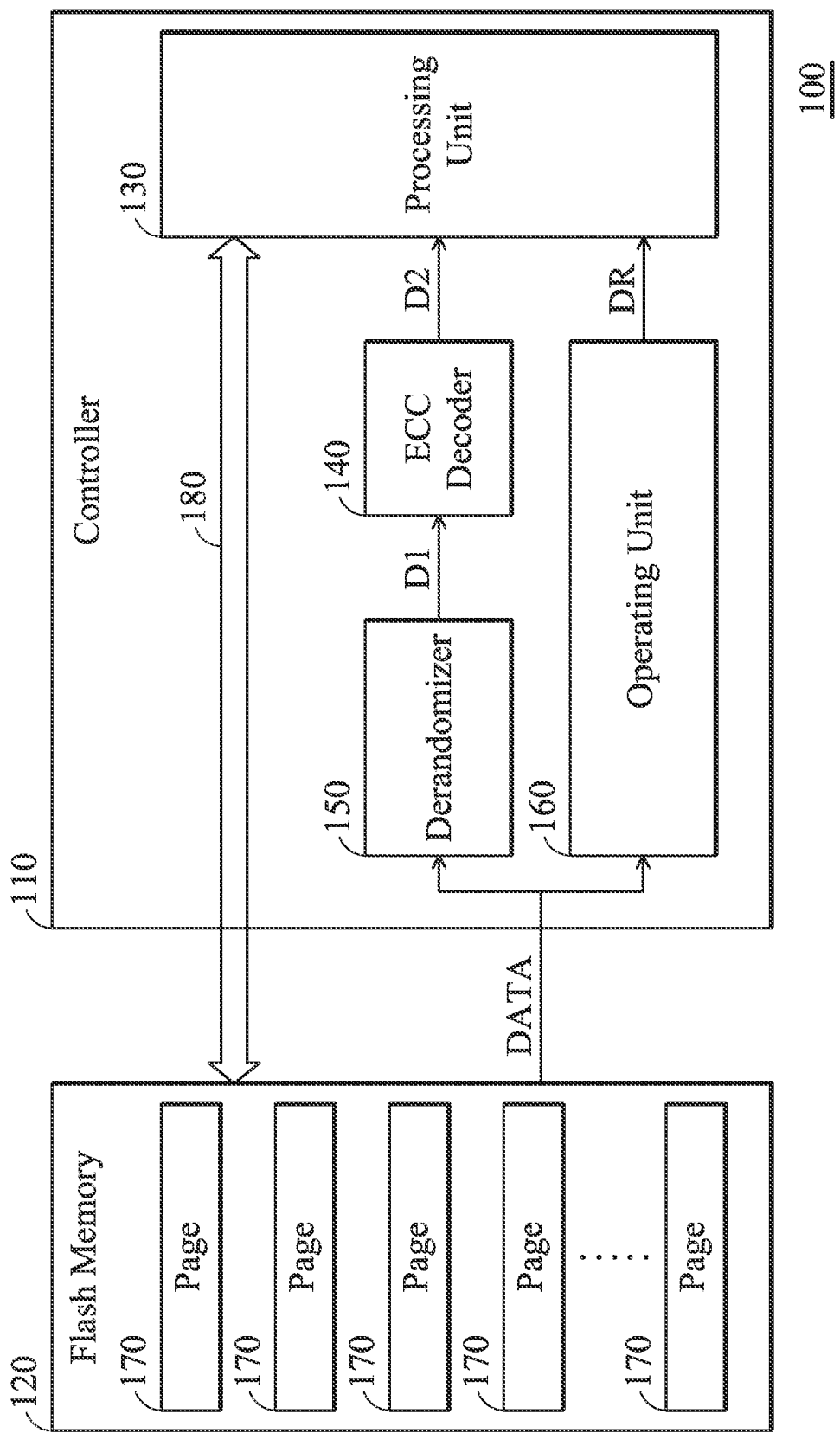
FIG. 1 shows a flash device according to an embodiment of the invention.

FIG. 1 shows a flash device 100 according to an embodiment of the invention. The flash device 100 comprises a controller 110 and a flash memory 120. The controller 110 is used to access the flash memory 120 and comprises a plurality of pages 170, wherein the controller 110 accesses the flash memory 120 in units of pages. The controller 110 comprises a processing unit 130, an error correction code (ECC) decoder 140, a derandomizer 150 and an operating unit 160. In the embodiment, the addresses and commands are transmitted between the processing unit 130 and the flash memory 120 via a bus 180. In response to a read command from the controller 110, the flash memory 120 provides a data stream DATA corresponding to the read command according to a read address from the controller 110, to the derandomizer 150 and the operating unit 160, wherein the data stream DATA is formed by a plurality of bytes stored in the page 170 corresponding to the read address. Next, the derandomizer 150 adjusts data of the bytes of the data stream DATA according to a random function, to provide a data stream D1. Next, the ECC decoder 140 decodes the data of the bytes of the data stream D1 according to an ECC code ECC_CODE, to provide a decoded data stream D2 to the processing unit 130. Next, according to the received data stream D2, the processing unit 130 determines whether the data stream D2 is valid data. If the error bit number of the data stream D2 exceeds the bit number that the ECC code ECC_CODE can correct, the processing unit 130 will determine that the page 170 corresponding to the read address is not the valid data. On the contrary, if the error bit number of the data stream D2 is smaller than or equal to the bit number that the ECC code ECC_CODE can correct, the processing unit 130 will determine that the page corresponding to the read address is the valid data. Furthermore, according to the logic level of each bit within each bytes of the data stream DATA, the operating unit 160 performs a specific operation (e.g. a count operation, an AND logic operation, an accumulation operation and so on) to obtain an operation result DR. Therefore, when the page 170 corresponding to the read address is not the valid data, the processing unit 130 will determine whether the page 170 corresponding to the read address is an empty page according to the operation result DR.

Figure 2:
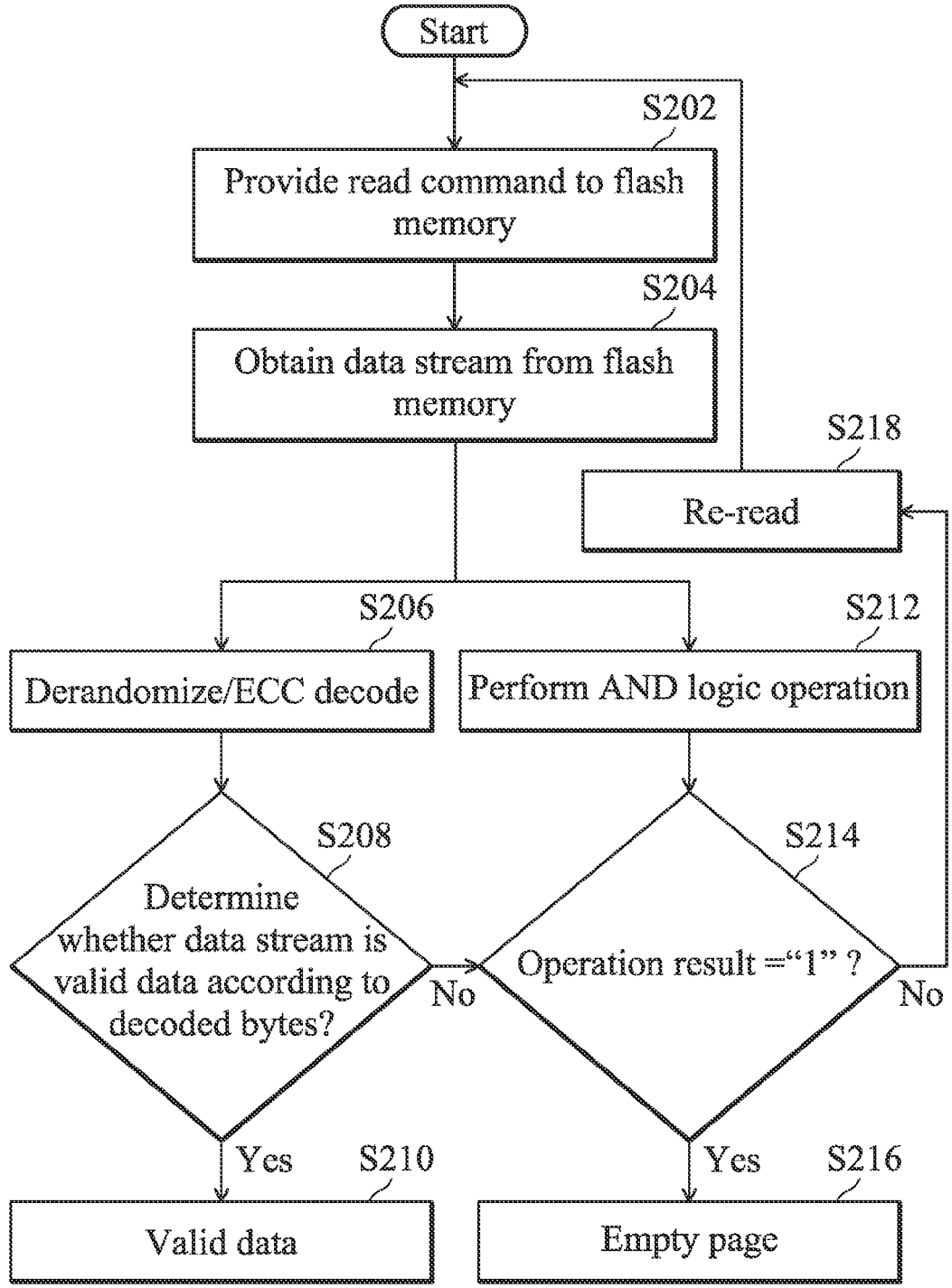
FIG. 2 shows an operating method for a flash device according to an embodiment of the invention, wherein the flash device comprises a controller and a flash memory.

FIG. 2 shows an operating method for a flash device (e.g. the flash device 100 of FIG. 1) according to an embodiment of the invention, wherein the flash device comprises a controller (e.g. the controller 110 of FIG. 1) and a flash memory (e.g. the flash memory 120 of FIG. 1). First, in step S202, the controller of the flash device provides a read command to the flash memory. Next, in response to the read command, the flash memory provides a data stream formed by a plurality of bytes corresponding to the read command, to the controller (step S204), wherein the bytes of the data stream are stored in a specific page corresponding to the read address. Next, according to the data stream obtained in step S204, the controller performs a de-random function operation according to a random code and a decoding operation according to an ECC code for the bytes of the data stream (step S206). Next, according to the decoded bytes, the controller determines whether the data stream is valid data (step S208). For example, if the error bit number of the decoded bytes exceeds the bit number that the ECC code can correct, the controller determines that the data stream corresponding to the read address is not the valid data. Conversely, if the error bit number of the decoded bytes is smaller than or equal to the bit number that the ECC code can correct, the controller determines that the data stream corresponding to the read address is the valid data (S210). Furthermore, according to the data stream obtained in step S204, the controller also performs an AND logic operation for the logic level of each bit of each of the bytes of the data stream, to obtain an operation result (step S212). Next, when the data stream corresponding to the read address is not the valid data, the controller further determines whether the specific page corresponding to the read address is an empty page according to the operation result obtained in step S212 (step S214). In general, in a flash memory, if each bit of a page has the logic "1", the page is considered an empty page. Therefore, when the operation result indicates that the logic level of each bit of each of the bytes of the data stream is a high logic level (i.e. the logic "1"), the controller will determine that the specific page is the empty page (step S216). Conversely, when the operation result indicates that logic level of any bit of the data stream is a low logic level (i.e. the logic "0"), the controller will determine that the specific page is not the empty page, and the controller will re-perform the read operation (step S218).

Figure 3:
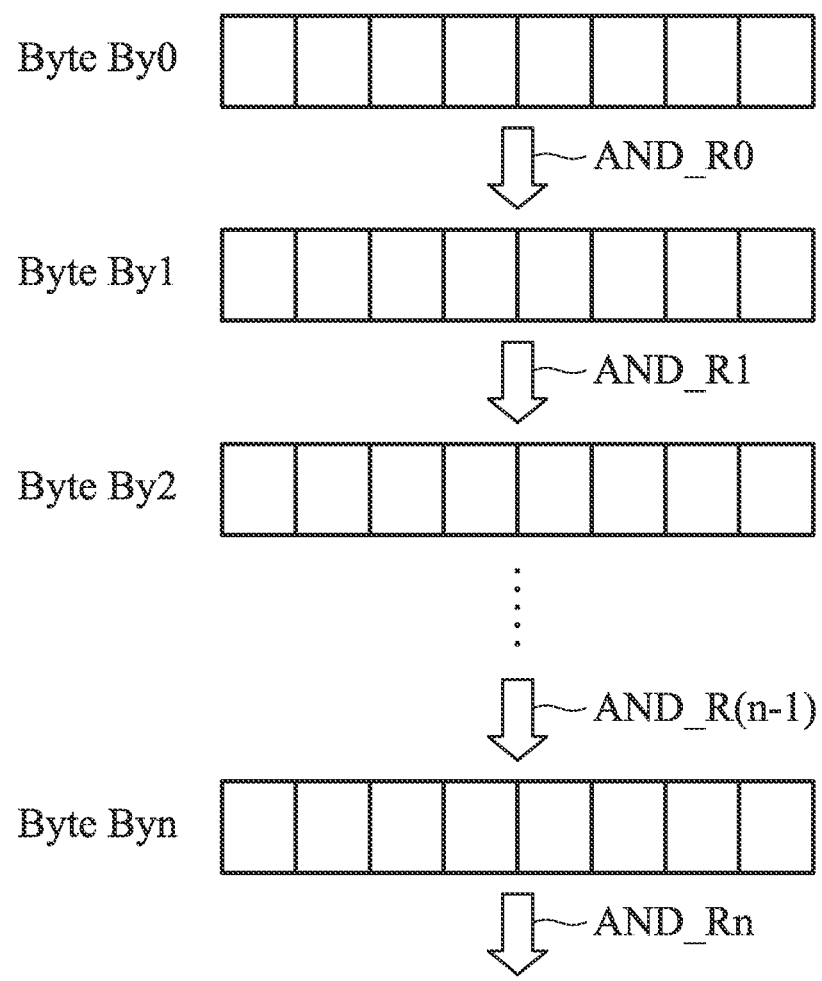
FIG. 3 shows an example illustrating the AND logic operation of step S212 of FIG. 2.

FIG. 3 shows an example illustrating the AND logic operation of step S212 of FIG. 2. In the embodiment, the data stream comprises a plurality of bytes By0-Byn. First, when receiving the byte By0, the controller performs an AND logic operation for the logic level of each bit of the byte By0, to obtain an operation result AND_R0. For example, if the byte By0 is "11111111", the operation result AND_R0 is a logic "1", and if the logic level of any bit of the byte By0 is a low logic level (such as "11110111", "01111111", "01110111" etc.), the operation result AND_R0 is a logic "0". Next, when receiving the byte By1, the controller performs an AND logic operation for the operation result AND_R0 and the logic level of each bit of the byte By1, to obtain an operation result AND_R1, and so on. When receiving the byte Byn, the controller performs an AND logic operation for the operation result AND_R(n−1) and the logic level of each bit of the byte Byn, to obtain an operation result AND_Rn. Therefore, when all bits of the bytes By0-Byn of the data stream are the logic "1", the controller determines that the operation result AND_Rn is a logic "1". On the contrary, when the logic level of any bit of the bytes By0-Byn of the data stream is the logic "0", the controller determines that the operation result AND_Rn is a logic "0". Furthermore, in one embodiment, the controller obtains the operation result of each byte in advance (e.g. the operation result AND_R1 only indicates a result of the AND logic operation of each bit of the byte By1, and the operation result AND_Rn only indicates a result of the AND logic operation of each bit of the byte Byn), respectively, and then the controller performs an AND logic operation for the operation results of all bytes, to obtain a final operation result.

Figure 4:
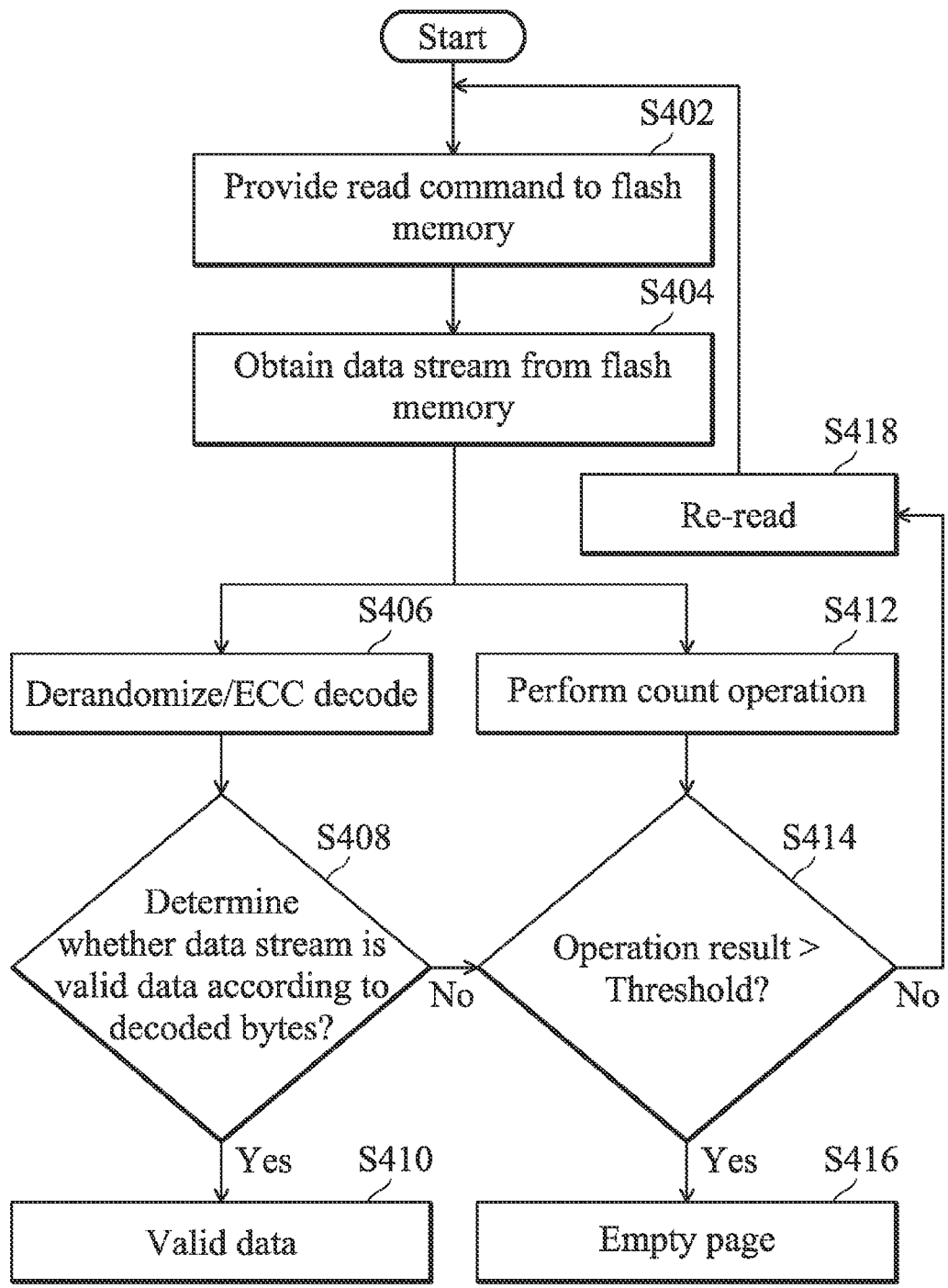
FIG. 4 shows an operating method for a flash device according to another embodiment of the invention, wherein the flash device comprises a controller and a flash memory.

Ideally, the logic level of each bit of the empty page is the logic "1". However, in actual applications, a flash memory may be damaged during the manufacturing process or when being used, such that some bits may be invalid bits. FIG. 4 shows an operating method for a flash device (e.g. the flash device 100 of FIG. 1) according to another embodiment of the invention, wherein the flash device comprises a controller (e.g. the controller 110 of FIG. 1) and a flash memory (e.g. the flash memory 120 of FIG. 1). First, in step S402, the controller of the flash device provides a read command to the flash memory. Next, in response to the read command, the flash memory provides a data stream formed by a plurality of bytes corresponding to the read command, to the controller (step S404), wherein the bytes of the data stream are stored in a specific page corresponding to the read address. Next, according to the data stream obtained in step S404, the controller performs a de-random function operation according to a random code and a decoding operation according to an ECC code for the bytes of the data stream (step S406). Next, according to the decoded bytes, the controller determines whether the data stream is valid data (step S408). For example, if the error bit number of the decoded bytes exceeds the bit number that the ECC code can correct, the controller determines that the data stream corresponding to the read address is not the valid data. Conversely, if the error bit number of the decoded bytes is smaller than or equal to the bit number that the ECC code can correct, the controller determines that the data stream corresponding to the read address is the valid data (S410). Furthermore, according to the data stream obtained in step S404, the controller also counts the bit value of each bit of the each bytes of the data stream (i.e. accumulating the bit number of the bits that has a logic level "1"), to obtain an operation result (step S412). In other words, the operation result is used to indicate the bit number of the bits having a logic level "1" of the bytes of the data stream. Next, when the data stream corresponding to the read address is not the valid data, the controller further determines whether the specific page corresponding to the read address is an empty page according to the operation result obtained in step S412 (step S414). When the operation result indicates that the bit number of the bits having a logic level "1" of the data stream is larger than a first threshold value, the controller determines that the specific is the empty page (step S416). Conversely, when the operation result indicates that the bit number of the bits having a logic level "1" of the data stream is smaller than or equal to the first threshold value, the controller determines that the specific page is not the empty page, and the controller will re-perform the read operation (step S418). In another embodiment, the controller is used to accumulate the bits that has a logic level "0", to obtain the operation result. Therefore, when the operation result indicates that the bit number of the bits having a logic level "0" of the data stream is smaller than a second threshold value, the controller determines that the specific page is the empty page. Conversely, when the operation result indicates that the bit number of the bits having a logic level "0" of the data stream is larger than or equal to the second threshold value, the controller determines that the specific page is not the empty page, and then re-performs the read operation. It should be noted that the first threshold value and the second threshold value can be determined and adjusted by software according to actual applications. In one embodiment, the first and second threshold values are determined according to the bit number of a check code of an ECC code of the memory device. For example, in a memory device, each of the 1094 (i.e. 1024+70) bytes has a protection provided by a 40-bit check code of the ECC code. Thus, the second threshold value may be 40 and the first threshold value may be 8712 (e.g. (1024+70)*8−40). Therefore, after the data stream having the 1094 bytes is obtained, the controller will count the bits having a logic level "1" to obtain a counting result. When the counting result is larger than 8712, the controller will determine that the specific page is an empty page, wherein the 1094 bytes are stored in the specific page.

Figure 5:
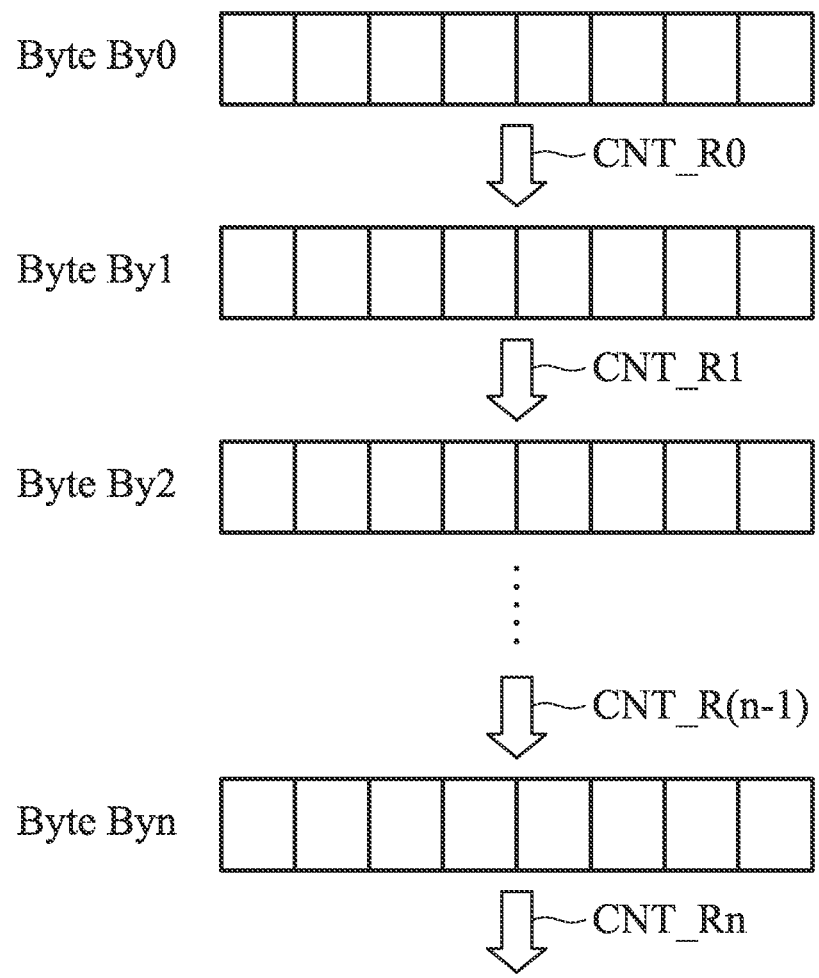
FIG. 5 shows an example illustrating the count operation performed in step S412 of FIG. 4.

FIG. 5 shows an example illustrating the count operation performed in step S412 of FIG. 4. In the embodiment, the data stream comprises a plurality of bytes By0-Byn. First, when receiving the byte By0, the controller accumulates the bits having a logic level "1" of the byte By0, to obtain an operation result CNT_R0. For example, if the byte By0 is "11111111", the operation result CNT_R0 is 8, and if the byte By0 is "01110111", the operation result CNT_R0 is 6. Next, when receiving the byte By1, the controller accumulates the operation result CNT_R0 and the bits having a logic level "1" of the byte By1, to obtain an operation result CNT_R1, and so on. When receiving the byte Byn, the controller accumulates the operation result CNT_R(n−1) and the bits having a logic level "1" of the byte Byn, to obtain an operation result CNT_Rn. Next, the controller compares the operation result CNT_Rn with a first threshold value. Therefore, when the operation result CNT_Rn is larger than the first threshold value, the controller determines that the specific page is an empty page. Conversely, when the operation result CNT_Rn is smaller than or equal to the first threshold value, the controller determines that the specific page is not the empty page.

Compared with the conventional flash device, the controllers of the embodiments only need to perform a read operation for the flash memory once, and then it is determined whether the read page is an empty page or valid data. Thus, initialization time of the flash translation layer is shortened.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flash device, comprising:
a flash memory, comprising a plurality of pages; and
a controller coupled to the flash memory, comprising:
an operating unit, receiving a plurality of bytes of the page which are from the flash memory and corresponding to a read command, and obtaining an operation result according to a logic level of each bit of each of the bytes;
an error correction code decoder, decoding the bytes of the page according to an error correction code; and
a processing unit coupled to the operating unit and the error correction code decoder, determining whether the page is valid data according to the decoded bytes, and determining whether the page is an empty page according to the operation result after determining that the page is not the valid data,
wherein when the operation result indicates that the logic level of at least one bit of the bytes is a low logic level, the processing unit re-provides the read command to the flash memory.

2. The flash device as claimed in claim 1, wherein the controller further comprises:
a derandomizer coupled between the flash memory and the error correction code decoder, adjusting the bytes of the page according to a random function, wherein the adjusted bytes of the page are decoded by the EEC decoder.

3. The flash device as claimed in claim 1, wherein the operating unit performs an AND logic operation for each bit of each of the bytes, to obtain the operation result.

4. The flash device as claimed in claim 3, wherein when the operation result indicates that the logic level of each bit of each of the bytes is a high logic level, the processing unit determines that the page is the empty page.

5. The flash device as claimed in claim 1, wherein the operating unit counts the bits of the bytes having a high logic level, to obtain the operation result.

6. The flash device as claimed in claim 5, wherein the operation result indicates the bit number of the bits of the bytes having a high logic level, and when the operation result is larger than a threshold value, the processing unit determines that the page is the empty page, and when the operation result is smaller than or equal to the threshold value, the processing unit re-provides the read command to the flash memory.

7. The flash device as claimed in claim 6, wherein the threshold value is determined according to the number of bits of the error correction code.

8. The flash device as claimed in claim 1, wherein when the error bit number of the decoded bytes of the page exceeds the bit number that the EEC code can correct, the processing unit determines that the page is not the valid data, and when the error bit number of the decoded bytes of the page is smaller than or equal to the bit number that the EEC code can correct, the processing unit determines that the page is the valid data.

9. An operating method for a flash device, wherein a flash memory comprises a plurality of pages, comprising:
receiving a plurality of bytes of the page which are from the flash memory and corresponding to a read command;
obtaining an operation result according to a logic level of each bit of each of the bytes;
decoding the bytes of the page according to an error correction code;
determining whether the page is valid data according to the decoded bytes; and
determining whether the page is an empty page according to the operation result after determining that the page is not the valid data,
wherein the step of determining whether the page is the empty page according to the operation result further comprises:
re-providing the read command to the flash memory when the operation result indicates that the logic level of at least one bit of the bytes is a low logic level.

10. The operating method for the flash device as claimed in claim 9, wherein the step of determining whether the page is the valid data further comprises:
adjusting the bytes of the page according to a random function; and decoding the adjusted bytes of the page.

11. The operating method for the flash device as claimed in claim 9, wherein the step of determining whether the page is the empty page according to the operation result further comprises:
    performing an AND logic operation for each bit of each of the bytes, to obtain the operation result; and
    determining that the page is the empty page, when the operation result indicates that the logic level of each bit of each of the bytes is a high logic level.

12. The operating method for the flash device as claimed in claim 9, wherein the step of determining whether the page is the empty page according to the operation result further comprises:
    counting the bits of the bytes having a high logic level, to obtain the operation result, wherein the operation result indicates the bit number of the bits of the bytes having a high logic level;
    determining that the page is the empty page when the operation result is larger than a threshold value; and
    re-providing the read command to the flash memory when the operation result is smaller than or equal to the threshold value.

13. The operating method for the flash device as claimed in claim 12, wherein the threshold value is determined according to the number of bits of the error correction code.

14. The operating method for the flash device as claimed in claim 9, wherein the step of determining whether the page is the valid data further comprises:
    determining that the page is not the valid data when the error bit number of the decoded bytes of the page exceeds the bit number that the EEC code can correct; and
    determining that the page is the valid data when the error bit number of the decoded bytes of the page is smaller than or equal to the bit number that the EEC code can correct.

* * * * *